(12) United States Patent
Sollie et al.

(10) Patent No.: US 12,297,032 B2
(45) Date of Patent: May 13, 2025

(54) INSULATED PANELS

(71) Applicant: Pratt Corrugated Holdings, Inc., Brookhaven, GA (US)

(72) Inventors: Greg Sollie, Sharpsburg, GA (US); Jamie Waltermire, Peachtree City, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 33 days.

(21) Appl. No.: 16/991,797

(22) Filed: Aug. 12, 2020

(65) Prior Publication Data

US 2021/0047102 A1 Feb. 18, 2021

Related U.S. Application Data

(60) Provisional application No. 62/886,695, filed on Aug. 14, 2019.

(51) Int. Cl.
| | |
|---|---|
| *B32B 29/08* | (2006.01) |
| *B29C 44/18* | (2006.01) |
| *B31D 3/00* | (2017.01) |
| *B31D 5/00* | (2017.01) |
| *B32B 3/28* | (2006.01) |

(Continued)

(52) U.S. Cl.
CPC .......... *B65D 81/3823* (2013.01); *B31D 3/005* (2013.01); *B31D 5/00* (2013.01); *B32B 3/28* (2013.01); *B32B 5/20* (2013.01); *B32B 7/12* (2013.01); *B32B 29/007* (2013.01); *B32B 29/08* (2013.01); *B32B 37/12* (2013.01); *B32B 38/00* (2013.01); *B65D 5/02* (2013.01); *B32B 2038/0084* (2013.01); *B32B 2307/304* (2013.01); *B32B 2439/62* (2013.01)

(58) Field of Classification Search
CPC .......... B32B 29/08; B32B 3/28; B32B 21/06; B32B 27/10; B32B 27/12; B32B 29/002; B32B 29/007
See application file for complete search history.

(56) References Cited

U.S. PATENT DOCUMENTS

| | | | |
|---|---|---|---|
| 2,973,295 A | 2/1961 | Rodgers, Jr. | |
| 3,526,556 A | 9/1970 | Berner | |

(Continued)

FOREIGN PATENT DOCUMENTS

| | | |
|---|---|---|
| EP | 0818305 | 1/1998 |
| FR | 2516447 | 5/1983 |

(Continued)

OTHER PUBLICATIONS

Esteva, Maria; Research Paper for Corrugated Polypropylene: Properties and its use in conservation, technology and Structure of Records Materials, Fall 2001, 27 pgs.

(Continued)

*Primary Examiner* — Maria V Ewald
*Assistant Examiner* — Daniel P Dillon
(74) *Attorney, Agent, or Firm* — Taylor English Duma LLP

(57) ABSTRACT

An insulated panel includes a first layer defining an inner surface; a corrugated medium defining a plurality of peaks, the plurality of peaks attached to the inner surface, a plurality of flutes defined between the corrugated medium and the inner surface; and an insulation material at least partially filling a flute of the plurality of flutes.

10 Claims, 9 Drawing Sheets

(51) Int. Cl.
  *B32B 5/20* (2006.01)
  *B32B 7/12* (2006.01)
  *B32B 21/06* (2006.01)
  *B32B 27/10* (2006.01)
  *B32B 29/00* (2006.01)
  *B32B 37/12* (2006.01)
  *B32B 38/00* (2006.01)
  *B65D 5/02* (2006.01)
  *B65D 81/38* (2006.01)

(56) References Cited

U.S. PATENT DOCUMENTS

| | | | |
|---|---|---|---|
| 5,256,467 | A | 10/1993 | Kato |
| 5,705,536 | A * | 1/1998 | Tomka .................... C08B 30/12 521/84.1 |
| 6,787,245 | B1 | 9/2004 | Hayes |
| 8,389,079 | B2 | 3/2013 | Babinsky et al. |
| 8,529,723 | B2 | 9/2013 | Fu et al. |
| 8,541,074 | B2 | 9/2013 | Babinsky et al. |
| 8,647,717 | B2 | 2/2014 | Babinsky et al. |
| 8,652,598 | B2 | 2/2014 | Babinsky et al. |
| 8,999,491 | B2 | 4/2015 | Blum et al. |
| 9,056,712 | B2 | 6/2015 | Cook et al. |
| 9,522,772 | B2 | 12/2016 | Fu et al. |
| 9,580,228 | B2 | 2/2017 | Fu et al. |
| 9,580,629 | B2 | 2/2017 | Huang et al. |
| 9,591,937 | B2 | 3/2017 | Fu et al. |
| 9,648,969 | B2 | 5/2017 | Fu et al. |
| 9,849,655 | B2 | 12/2017 | Huang et al. |
| 10,099,459 | B2 | 10/2018 | Huang et al. |
| 10,144,573 | B2 | 12/2018 | Fu et al. |
| 10,208,429 | B2 | 2/2019 | Huang et al. |
| 2005/0214512 | A1 * | 9/2005 | Fascio .................... B65D 81/03 156/208 |
| 2007/0122584 | A1 | 5/2007 | Song et al. |
| 2009/0304999 | A1 | 12/2009 | Fascio |
| 2013/0190154 | A1 | 7/2013 | Babinsky et al. |
| 2013/0303351 | A1 | 11/2013 | Fu et al. |
| 2014/0054300 | A1 * | 2/2014 | Gilpatrick .......... B65D 81/3858 220/592.2 |
| 2014/0335323 | A1 * | 11/2014 | Lipscomb ................ B32B 7/12 428/184 |
| 2018/0050857 | A1 * | 2/2018 | Collison ............... B29C 70/545 |
| 2019/0106263 | A1 | 4/2019 | Fu et al. |
| 2019/0136456 | A1 | 5/2019 | Huang et al. |
| 2019/0218720 | A1 | 7/2019 | Huang et al. |
| 2020/0056334 | A1 * | 2/2020 | Heiskanen ............. D21H 27/10 |

FOREIGN PATENT DOCUMENTS

| | | | | |
|---|---|---|---|---|
| GB | 1169701 | | 11/1969 | |
| WO | WO-2008099195 A1 * | 8/2008 | | ............. B31B 50/00 |

OTHER PUBLICATIONS

Reany, et al.; Article entitled: "Corrugated skin in a foam core sandwich panel", Composite Structures 89 (2009), 11 pgs.
Sasaki, et al.; Article entitled: "Heat Insulating Cardboard Composed of Corrugated Foamed Polystyrene Layer", Packaging Technology and Science (1999), 7 pgs.

* cited by examiner

INSULATED PANELS

CROSS-REFERENCE TO RELATED APPLICATIONS

This application claims the benefit of U.S. Provisional Application No. 62/886,695, filed on Aug. 14, 2019, which is hereby incorporated by reference in its entirety.

TECHNICAL FIELD

This disclosure relates to insulated panels. Specifically, this disclosure relates to insulated panels that are recyclable.

BACKGROUND

Increasingly, consumers are turning to the internet to purchase goods, rather than to visit brick-and-mortar stores. Increasingly fast shipping times have also brought about an increase in the popularity and feasibility for shipping temperature-controlled contents, such as food, medications, or other products. These contents must be shipped in packaging capable of maintaining elevated or lowered temperatures over a period of time sufficient to allow the package to be shipped and received by the consumer. Frequently, these packages utilize non-recyclable insulating materials, such as polystyrene foam, or materials which cannot be recycled together with one another, such as combinations of plastics and paper products. Often consumers fail to properly segregate these materials into their respective recyclable material streams, particularly if the different materials are integrated with one another or securely attached, such as with an adhesive. Consequently, many existing packaging solutions for shipping temperature-controlled contents are not properly recycled.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an insulated panel comprising a first layer defining an inner surface; a corrugated medium defining a plurality of peaks, the plurality of peaks attached to the inner surface, a plurality of flutes defined between the corrugated medium and the inner surface; and an insulation material at least partially filling a flute of the plurality of flutes.

Also disclosed a method for manufacturing an insulated panel, the method comprising attaching a first layer to a corrugated medium to form a plurality of flutes, the plurality of flutes defined between the first layer and the corrugated medium; activating a foaming action in an insulation material positioned within at least one flute of the plurality of flutes, the insulation material comprising starch, activating the foaming action in the insulation material comprising expanding the insulation material to at least partially fill the at least one flute of the plurality of flutes; and drying the insulation material.

Also disclosed is an insulated panel comprising a first layer comprising corrugated cardboard; a second layer comprising corrugated cardboard; and an insulation material adhered to the first layer and the second layer, the insulation material comprising cellulose.

Also disclosed is a method for manufacturing an insulated panel, the method comprising adhering an insulation material to a first layer of an insulated panel, the insulation material comprising cellulose, the first layer comprising corrugated cardboard; and adhering the insulation material to a second layer of the insulation panel, the second layer comprising corrugated cardboard.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
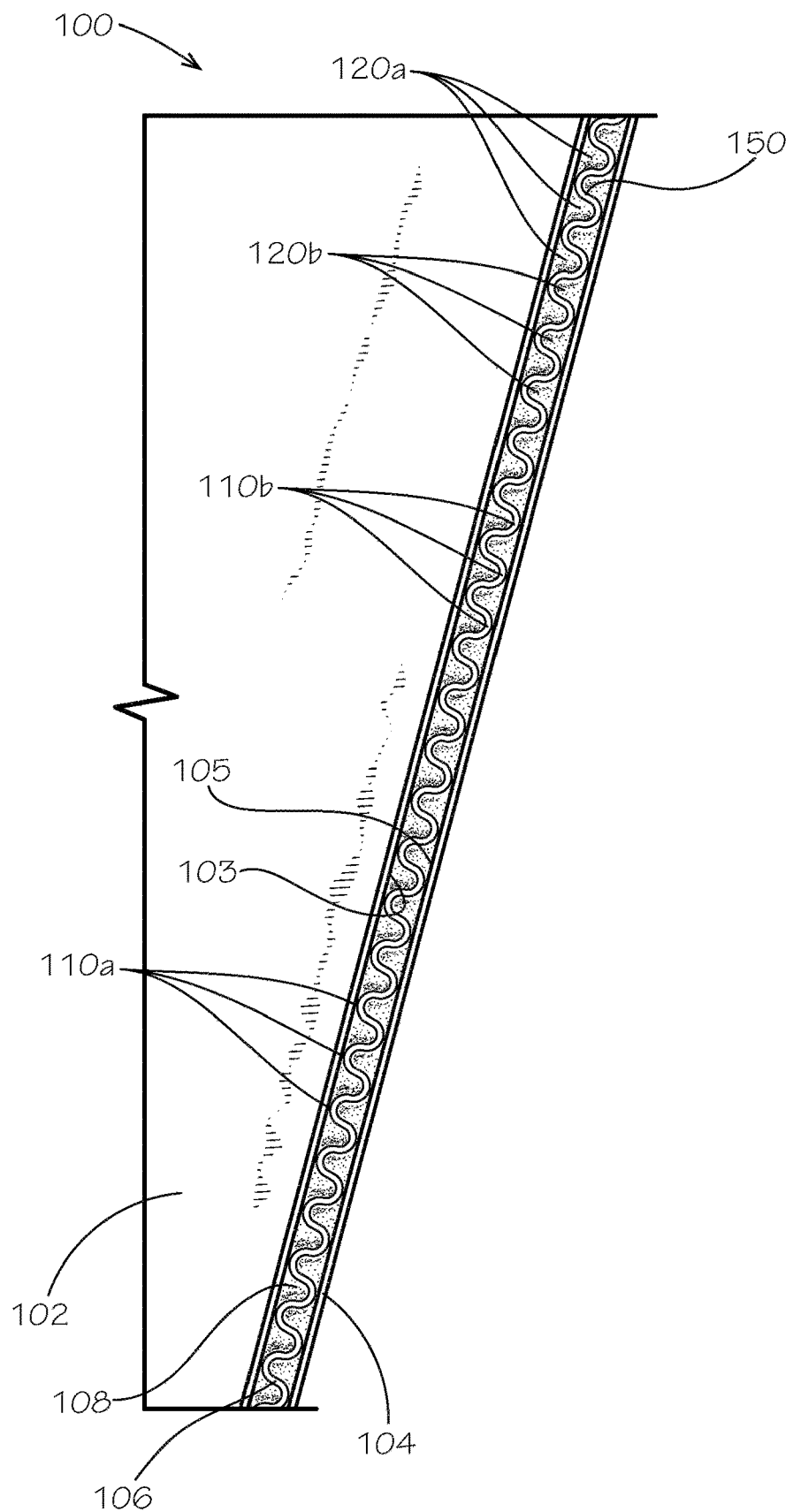
FIG. 1 is a perspective view of an insulated panel comprising a first layer, a second layer, a medium, and an insulation material, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an insulated panel and associated methods, systems, devices, and various apparatus. The insulated panel can comprise an insulation material and one or more layers. It would be understood by one of skill in the art that the disclosed insulated panel is described in but a few exemplary aspects among many. No particular terminology or description should be considered limiting on the disclosure or the scope of any claims issuing therefrom.

FIG. 1 is a perspective view of an insulated panel 100 comprising a first layer 102, a second layer 104, a medium 106, and an insulation material 108, in accordance with one aspect of the present disclosure. In particular, FIG. 1 shows an edge 150 of the insulated panel 100. In the aspect shown, the insulated panel 100 can be an insulated corrugate board. The medium 106 can be corrugated, and the medium 106 can define a first plurality of peaks 110*a* and a second plurality of peaks 110*b*. The first plurality of peaks 110*a* can be attached to an inner surface 103 of the first layer 102, and the second plurality of peaks 110*b* can be attached to an inner surface 105 of the second layer 104. In the present aspect, the medium 106 can be attached to the first layer 102 and the second layer 104 by a starch-based adhesive; however, in other aspects, the medium 106 can be attached to either or both of the first layer 102 and the second layer 104 by a different type of adhesive. In the present aspect, each of the first layer 102, the second layer 104, and the medium 106 can comprise Kraft paper; however, in other aspects, any or all of the first layer 102, the second layer 104, and the medium 106 can comprise a different material, such as paperboard, cardboard, plastic, fiberboard, or any other suitable material.

As shown by the edge 150, the insulated panel 100 can define a first plurality of flutes 120*a* between the medium 106 and the inner surface 103 of the first layer 102 and a second plurality of flutes 120*b* between the medium 106 and the inner surface 105 of the second layer 104. These flutes can be hollow, substantially linear spaces, and in the present aspect, both the first plurality of flutes 120*a* and the second plurality of flutes 120*b* can be filled with the insulation material 108. In other aspects, only the first plurality of flutes 120*a* or the second plurality of flutes 120*b* can be filled with the insulation material 108. In other aspects, some of the flutes of the first plurality of flutes 120*a* and/or some of the flutes of the second plurality of flutes 120*b* can be filled with the insulation material 108. In some aspects, the flutes of either or both of the first and second plurality of flutes 120*a,b* can be only partially filled with the insulation material 108. As demonstrated, the edge 150 can be open and unsealed; however, in other aspects, the edge 150 can be covered, enclosed, or sealed by a substance or another layer of material, for example and without limitation. For example, a paper laminate or other sheet material can seal the edge 150 in some aspects.

The insulated panel 100 can be manufactured as a large sheet of raw material, such as a master blank, from which smaller blanks or forms can be cut, through processes such as die-cutting or machine-working. In the aspects disclosed, the insulated panel 100 can still be formed, die-cut, scored, folded, and sealed, even with the presence of the insulation material 108. For example, one or more box blanks can be cut from the master blank to form multiple insulated boxes. In other aspects, different types of containers, such as clamshell containers, or different types of products, such as insulated cup sleeves, could be cut from the master blank. The only limitations of the width and length of the insulated panel 100 can be those of the machinery used to form it. For example and without limitation, the insulated panel 100 could measure 60 in. or 72 in. in width in some aspects. In other aspects, the insulated panel 100 can be larger or smaller in either length or width. In some aspects, smaller insulated panels 100, such as blanks specifically shaped and sized to form a single product, box, container, etc. can be manufactured individually.

In the present aspect, the insulation material 108 can be starch-based. For example and without limitation, the insulation material 108 can be a foamed starch material, or equivalent thereof, that can define a series of bubbles or voids within the starch material to provide a porous structure. In some aspects, the insulation material can comprise pure starch, without additives, that can then be foamed. The insulation material 108 can be compatible with recycling paper streams, such that the insulated panel 100 and products made thereof can be curb-side recyclable and repulpable, without the need to separate the insulation material 108 from the layers 102,104 and medium 106. In some aspects, the insulation material 108 can have adhesive qualities that can reinforce the insulated panel 100 structurally by attaching the medium 106 to each of the layers 102,104. Additionally, the insulation material 108 can demonstrate structural strength itself, which can help prevent bending or collapse of the insulated panel 100.

Figure 2:
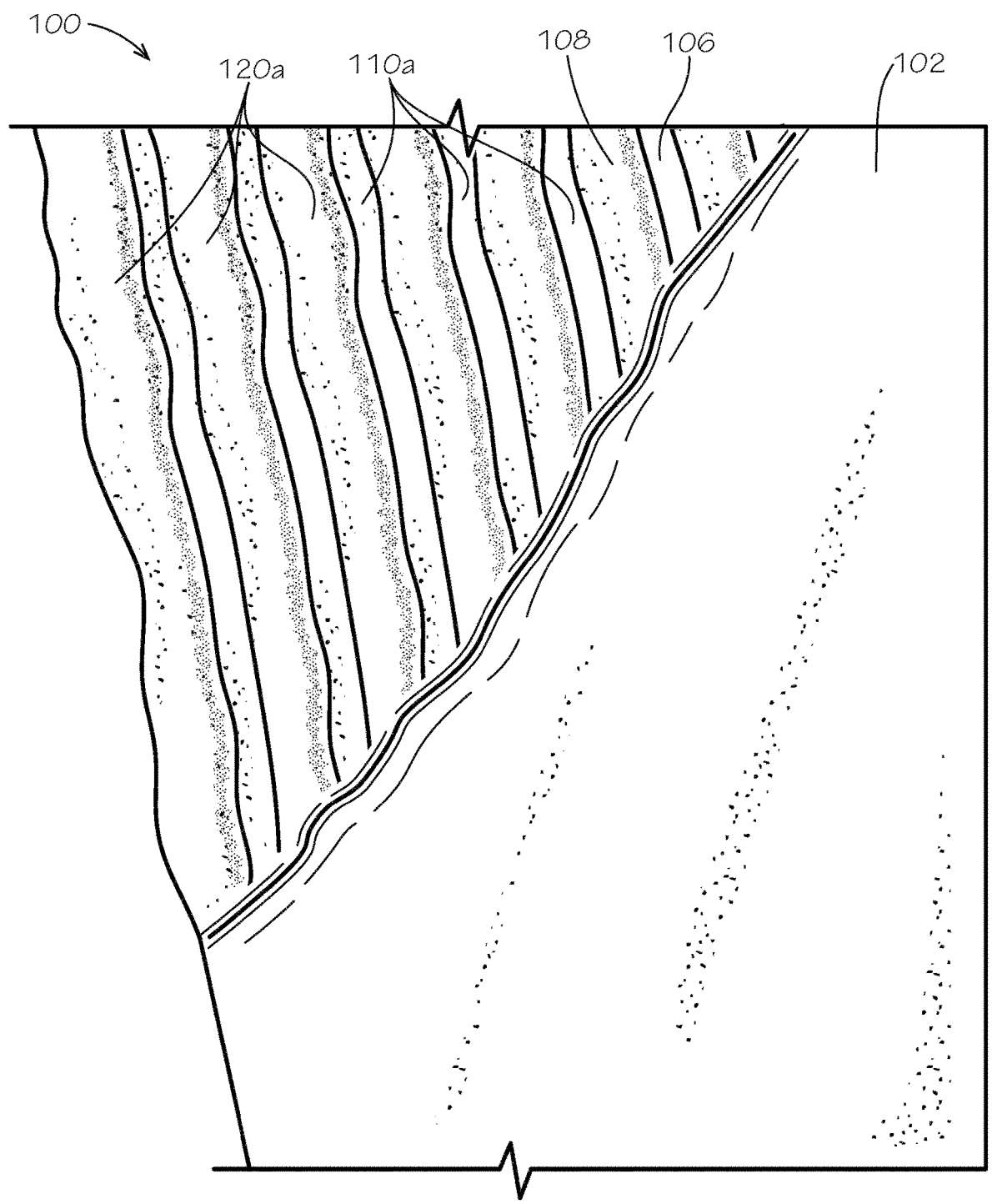
FIG. 2 is a front view of the insulated panel of FIG. 1 with a portion of the first layer peeled off.

FIG. 2 is a front view of the insulated panel 100 of FIG. 1 with a portion of the first layer 102 peeled off. With the first layer 102 peeled off, the first plurality of peaks 110a of the medium 106 can be exposed, along with the first plurality of flutes 120a, which can be separated from one another by the medium 106 and filled with the insulation material 108. As shown, the first plurality of flutes 120a can extend substantially linearly and parallel to one another.

Figure 3:
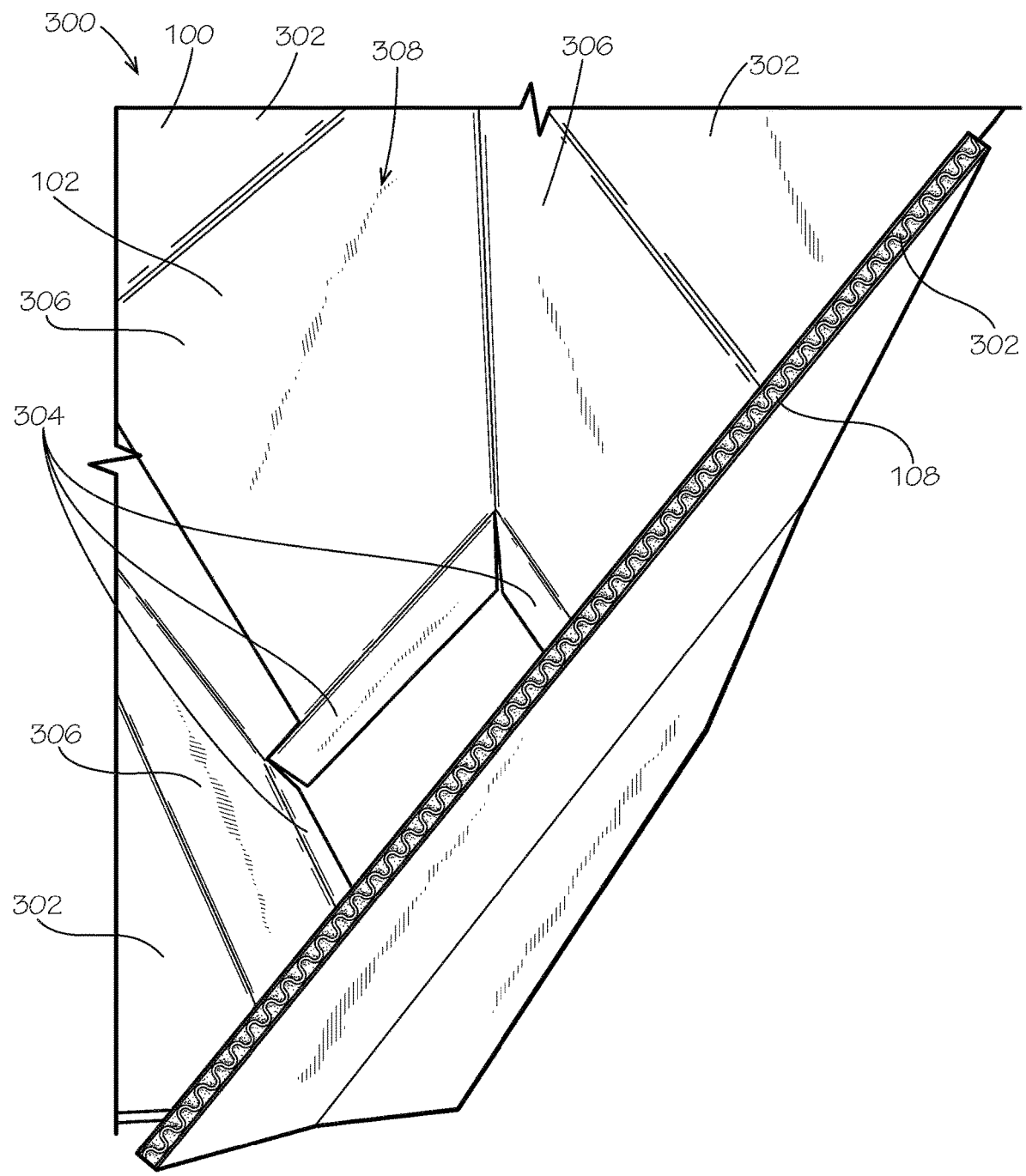
FIG. 3 is a perspective top view of a partially formed box formed from the insulated panel of FIG. 1.

FIG. 3 is a perspective top view of a partially formed box 300 formed from the insulated panel 100 of FIG. 1. The box 300 can be an example of an insulated container formed from the insulated panel 100. As shown, top panels 302 and bottom panels 304 can be in an open configuration, but side walls 306 can at least partially define a cavity 308 within the box 300. The top panels 302 and bottom panels 304 can be folded inward to fully enclose the cavity 308. In particular, the first layer 102 of the insulated panel 100 can face inwards and define the cavity 308; however, in other aspects, the second layer 104 (shown in FIG. 1) can define the cavity 308. The insulation material 108 can provide thermal insulation to the cavity 308, or for containers and products formed from the insulated panel 100, such as insulated cup sleeves for example and without limitation. The insulation material 108 can help maintain cold or hot temperatures within the cavity 308, particularly if a heat source material, such as a hot water bottle, or heat sink material, such as dry ice, is positioned within the cavity 308.

Figure 4:
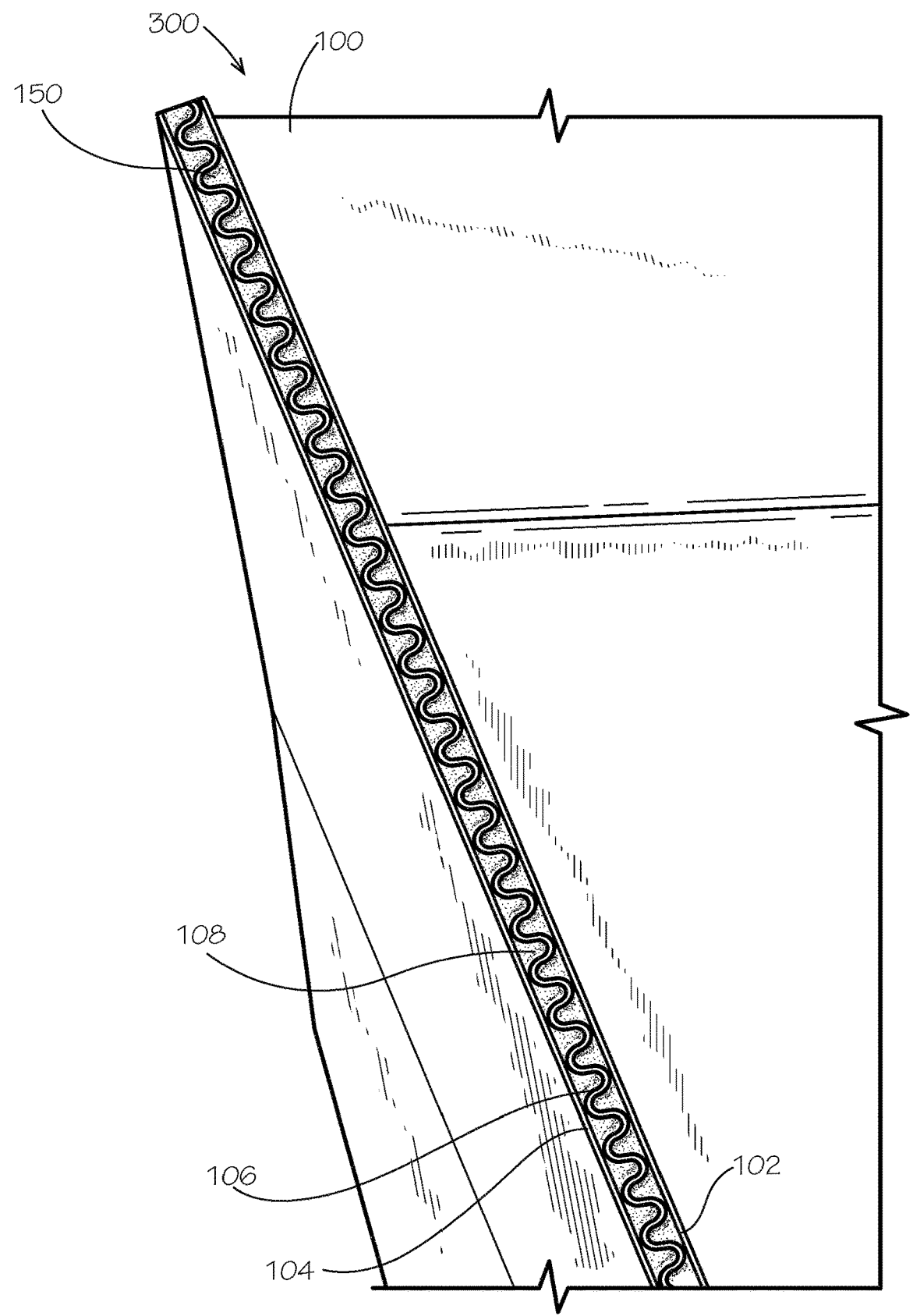
FIG. 4 is a close-up view of an edge of the box formed from the insulated panel of FIG. 1.

FIG. 4 is a close-up view of the edge 150 of the box 300 formed from the insulated panel 100 of FIG. 1, showing the first layer 102, the second layer 104, the medium 106, and the insulation material 108. The R-value of the box 300, or other packaging, can be varied depending upon the construction of the box 300 and the insulated panel 100. The R-value can be increased by increasing the flute size, and thereby increasing the thickness of the insulation material 108 within the flutes 120a,b (shown in FIG. 1). Additionally, in some aspects, the insulated panel 100 or the box 300 could define a multiple-wall construction. For example and without limitation, a second medium (not shown), similar to the medium 106, could be attached to the second layer 104, and a third layer (not shown) could be attached to the second medium. Flutes defined between the second layer, the second medium, and the third layer could then be filled with insulation material 108 to further increase the R-value of the insulated panel 100 and any products formed from it. Changes to the density and cell configuration of the foamed aspects of the insulation material 108 could also increase or decrease the R-value of the insulated panel 100. In some aspects utilizing the foamed starch material for the insulation material 108, the R-values of the foamed starch material can be comparable to those of expanded polystyrene.

The insulated panels 100 can be formed through a variety of methods. In a first method, starch resin beads can be formed in micro-sizes, such as 0.125 in. to 0.200 in. in diameter and approximately 0.100 in. thick for disc-shaped beads, for example and without limitation. Beads in the size range described can weigh approximately 1 gram per 150 beads, for example and without limitation. In other aspects, the starch resin beads may define a different shape, such as spherical, for example and without limitation. The starch resin beads can then be impregnated into both sides of the medium 106 layer, prior to attachment to the first layer 102 and the second layer 104. For example and without limitation, the starch resin beads can be pulverized into a powder that can be pressure rolled into the medium 106. Once the layers 102,104 are attached to the medium 106, heat, moisture, air, and/or pressure can then be used to activate a foaming action in the starch resin beads, which cause them to expand and fill the flutes 120a,b. For example and without limitation, tiny air or inert gas bubbles or moisture droplets within the starch resin beads can be heated causing them to expand. This expansion can provide the starch resin with a foam-like, or porous, consistency, and the starch resin can then be dried to harden and stabilize the foam structure. In other aspects, a vacuum may be applied to achieve the foamed structure. Exemplary heat sources can be microwaves, infrared radiation, ultrasonic waves, steam, or any other suitable heat source. The application of the insulation material can be metered to prevent the insulated panel 100 from deforming during the foaming action. Once the foam has hardened, any excess foam extending outwards from the edge 150 of the insulated panel 100 can then be trimmed off.

In a second method, starch resin can be applied as a film to both sides of the medium 106 or to the inner surfaces 103,105 of the layers 102,104, respectively, prior to attaching the medium 106 and layers 102,104. Once the layers 102,104 and medium 106 are attached to one another, heat, moisture, air, and/or pressure can be used to activate the foaming action of the starch resin film, which causes the starch resin to foam and fill the flutes 120a,b.

In a third method, starch resin bead foaming equipment can be installed in a corrugated production line, and a series of extrusion die openings oriented parallel to the fluting direction of the flutes 120a,b can apply a uniform layer of foamed starch to both sides of the medium 106, after fluting of the medium 106. Equal pressure can be exerted on both sides of the medium 106 to maintain a fluted shape, and then prior to lamination of the layers 102,104, a squeegee mechanism can ensure that excess material is removed from the medium 106. After lamination of the layers 102,104, the resulting insulated panel 100 can then be dried to harden the foamed starch within the flutes 120a,b.

In a fourth method, a foamable starch adhesive can be used to attached the layers 102,104 to the medium 106. This foamable starch adhesive can be applied in excess to fill the flutes 120a,b with the inclusion of a drying agent, such as water, that can be used to create air pockets in the foamable starch adhesive as the insulated panel 100 goes through the drying process. For example, moisture within the foamable starch adhesive can expand when heated during the drying process, and once dried via evaporation, a rigid starch cellular structure can remain within the flutes 120a,b.

Figure 5:
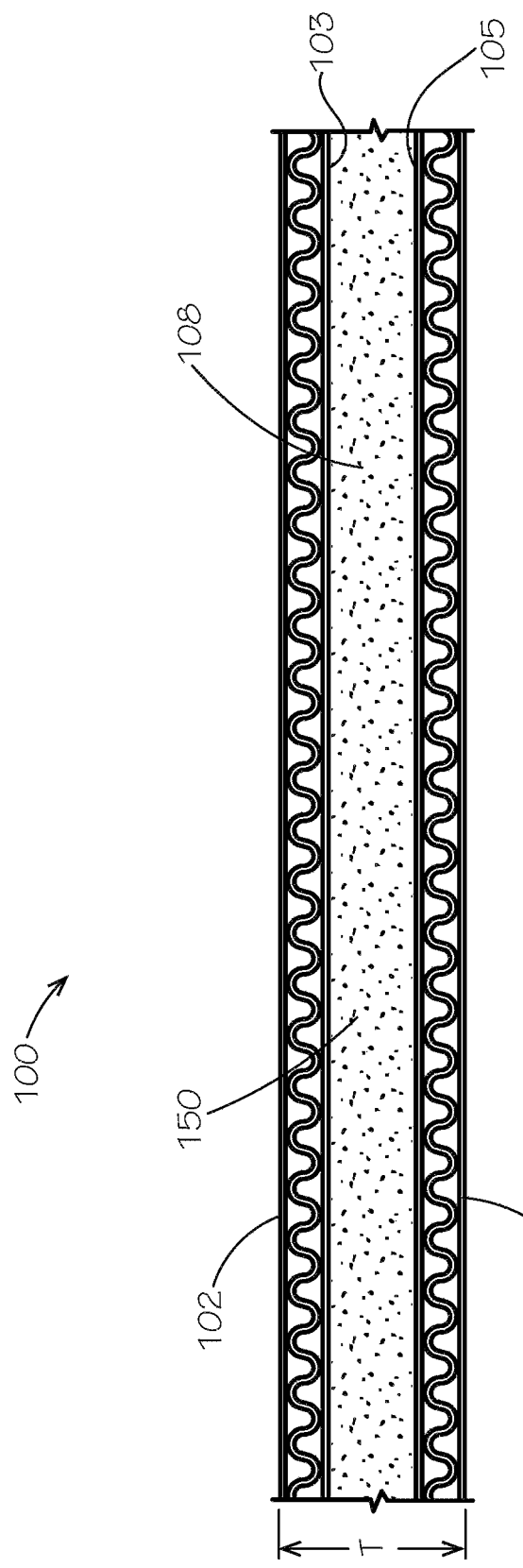
FIG. 5 is a side view of another aspect of the insulated panel in accordance with another aspect of the present disclosure, comprising another aspect of the first layer, the second layer, and the insulation material.

FIG. 5 is a side view of another aspect of the insulated panel 100 in accordance with another aspect of the present disclosure, comprising another aspect of the first layer 102, the second layer 104, and the insulation material 108. In particular, FIG. 5 shows the edge 150 of the insulated panel 100. In the aspect shown, the insulated panel 100 can be a corrugate laminated insulation board.

The insulation material 108 can be a fiber-based insulation. For example, in the present aspect, the insulation material 108 can be cellulose fiber insulation. The cellulose fiber insulation can comprise a binder, such as a poly-based binder. In some aspects, the binder accounts for less than 15% by weight of the insulation material 108. In some aspects, the binder accounts for less than 10% by weight of the insulation material 108. In some aspects, the binder accounts for 8% or less by weight of the insulation material 108.

The insulation material 108 can be adhered directly to the inner surface 103 of the first layer 102 and the inner surface 105 of the second layer 104. In some aspects, the entirety of the inner surfaces 103,105 can be adhered to the insulation material 108, which can prevent localized sliding or clumping of the insulation material 108 between the layers 102, 104. In the present aspect, the first layer 102 and the second layer 104 can each comprise corrugate board, such as corrugated cardboard. In other aspects, one or both of the first layer 102 and the second layer 104 can comprise a different material, such as fiberboard, Kraft paper, paperboard, or any other suitable material. In some aspects, either or both of the first layer 102 and the second layer 104 can be an insulated panel 100, in accordance with the aspect of FIG. 1, wherein the first layer 102 and/or the second layer 104 can comprise insulation material. In such aspects, the insulation material within the layers 102,104 can be different from the insulation material positioned between the layers 102,104. For example and without limitation, the insulation material within the flutes of the layers 102,104 can be a foamed, starch-based insulation, and the insulation material between the layers 102,104 can be a cellulose fiber material.

In the present aspect, the insulated panel 100 can be used in the production of boxes, pads, containers, dividers, partitions, insulated sleeves, and other products or containers. The insulated panel 100 can be formed in a large size as a master blank, and smaller production blanks or products can be cut out of the master blank to reduce waste. Alternatively, the insulated panel 100 can be produced as a specific blank for a specific product, such as a single box blank. The insulated panel 100 can be formed, die-cut, scored, folded, and sealed on existing high-speed converting machinery, even with the presence of the insulation material 108.

A thickness T of the insulated panel 100 can be varied to ensure compatibility with existing equipment. For example and without limitation, a ⅛"-thick layer of insulation material 108 can be attached to two layers 102,104 comprised of e-flute corrugated board to create a ¼"-thick insulated panel 100. In such an aspect, the insulated panel 100 can demonstrate an R-value of 1 or higher. Coupled with an appropriate amount of coolant, such as dry ice, an R-value of 1 or higher can be sufficient to provide several hours of thermal protection for a payload enclosed in a box formed from the insulated panel 100, such as the one shown in FIG. 8. In another aspect, a ¼"-thick layer of insulation material 108 can be laminated between two layers of e-flute corrugated board, resulting in a ⅜"-thick insulated panel 100. In some aspects, the thickness T can be greater than ½", depending upon the combination of flute size in the layers 102,104, thickness of the insulation material 108, and how many walls the insulated panel 100 comprises. For example, in a double-walled configuration, the insulated panel 100 could comprise two layers of insulation material 108 and three layers of corrugate, similar to the layers 102,104.

As shown, the edge 150 can be open and unsealed, and the insulation material 108 can be visible. Though not necessary, in aspects where desired, the edge 150 can be covered, enclosed, or sealed by a substance or another layer of material, for example and without limitation. In some aspects, the edge 150 can be sealed with a substance, such as a starch-based adhesive. In some aspects, a thin sealing strip, such as a strip of Kraft paper for example and without limitation, can be attached to the edge 150. In other aspects, the insulation material 108 can be encapsulated, such as within a layer of Kraft paper, and the encapsulated insulation material 108 can be laminated between the two layers 102,104 to enclose the edge 150. Sealing the edge 150 can prevent loose particles, fibers, or dust from falling out of the edge 150.

In the present aspect, the insulated panel 100 can be recyclable, including being single-stream, curb-side recyclable with paper and fiber products. Additionally, the insulated panel 100 can be repulpable and biodegradable.

Figure 6:
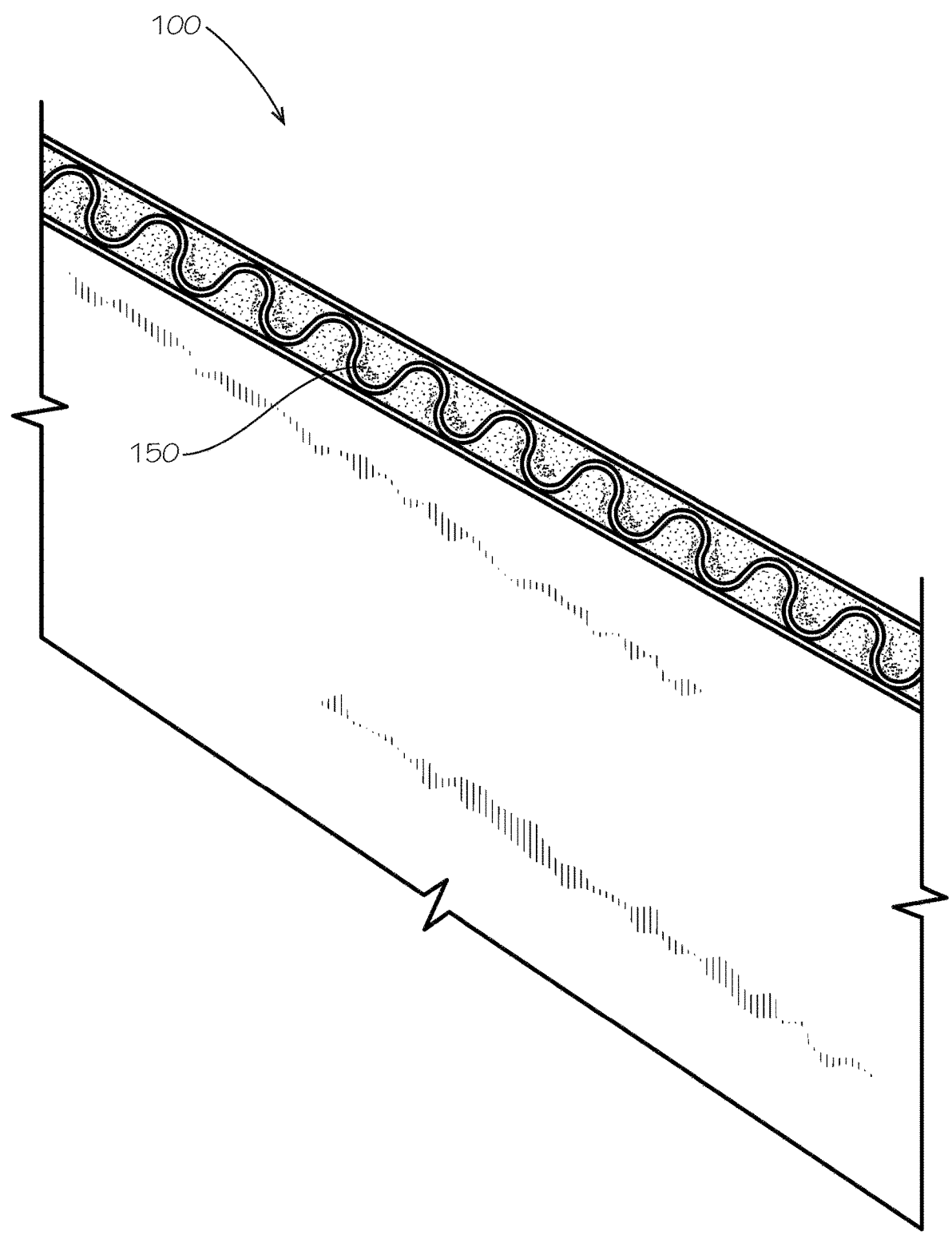
FIG. 6 is a perspective view of the edge of the insulated panel of FIG. 5.
Figure 7:
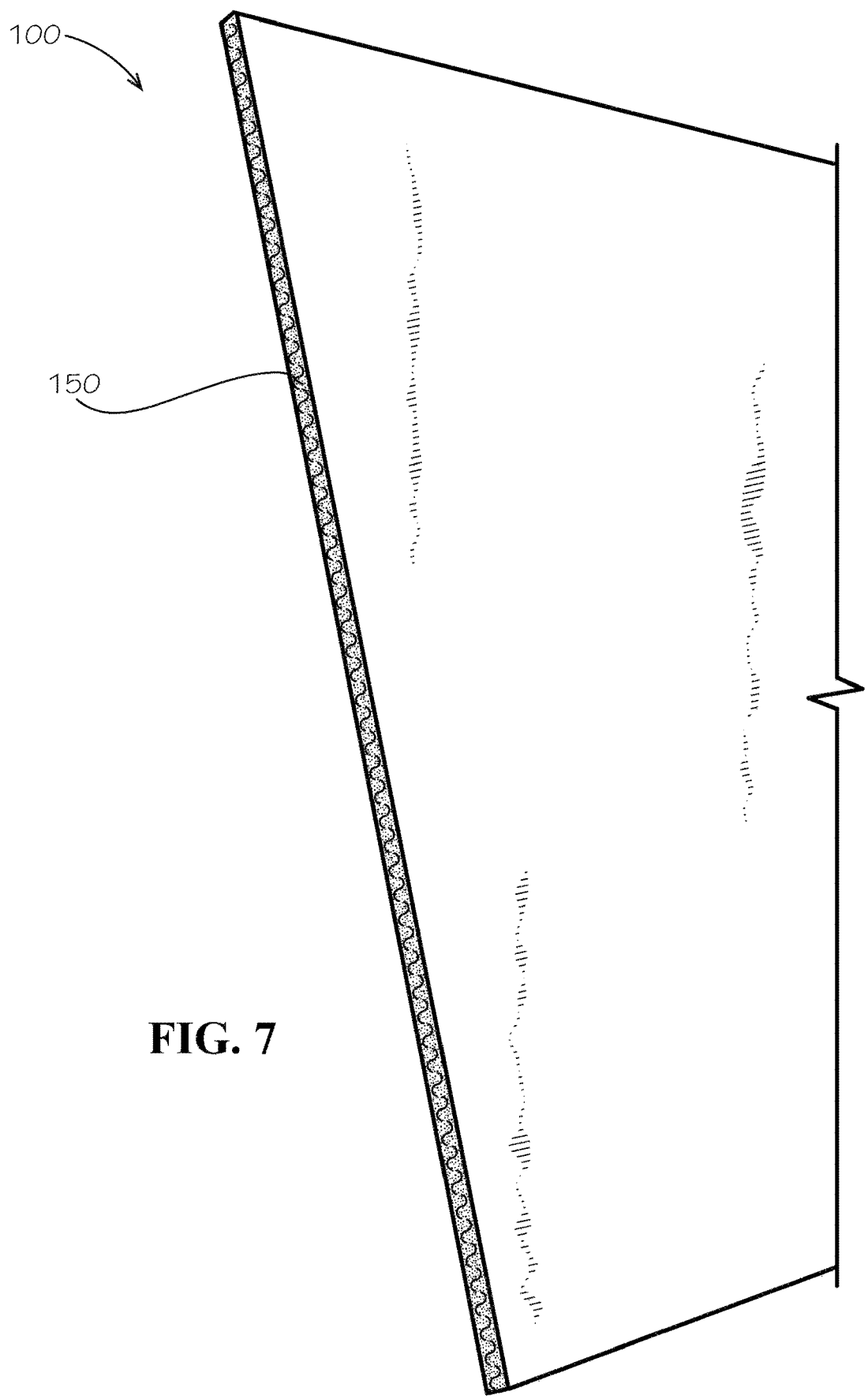
FIG. 7 is a perspective views of the edge of the insulated panel of FIG. 5.

FIGS. 6 and 7 show additional perspective views of the edge 150 of the insulated panel 100 of FIG. 5.

Figure 8:
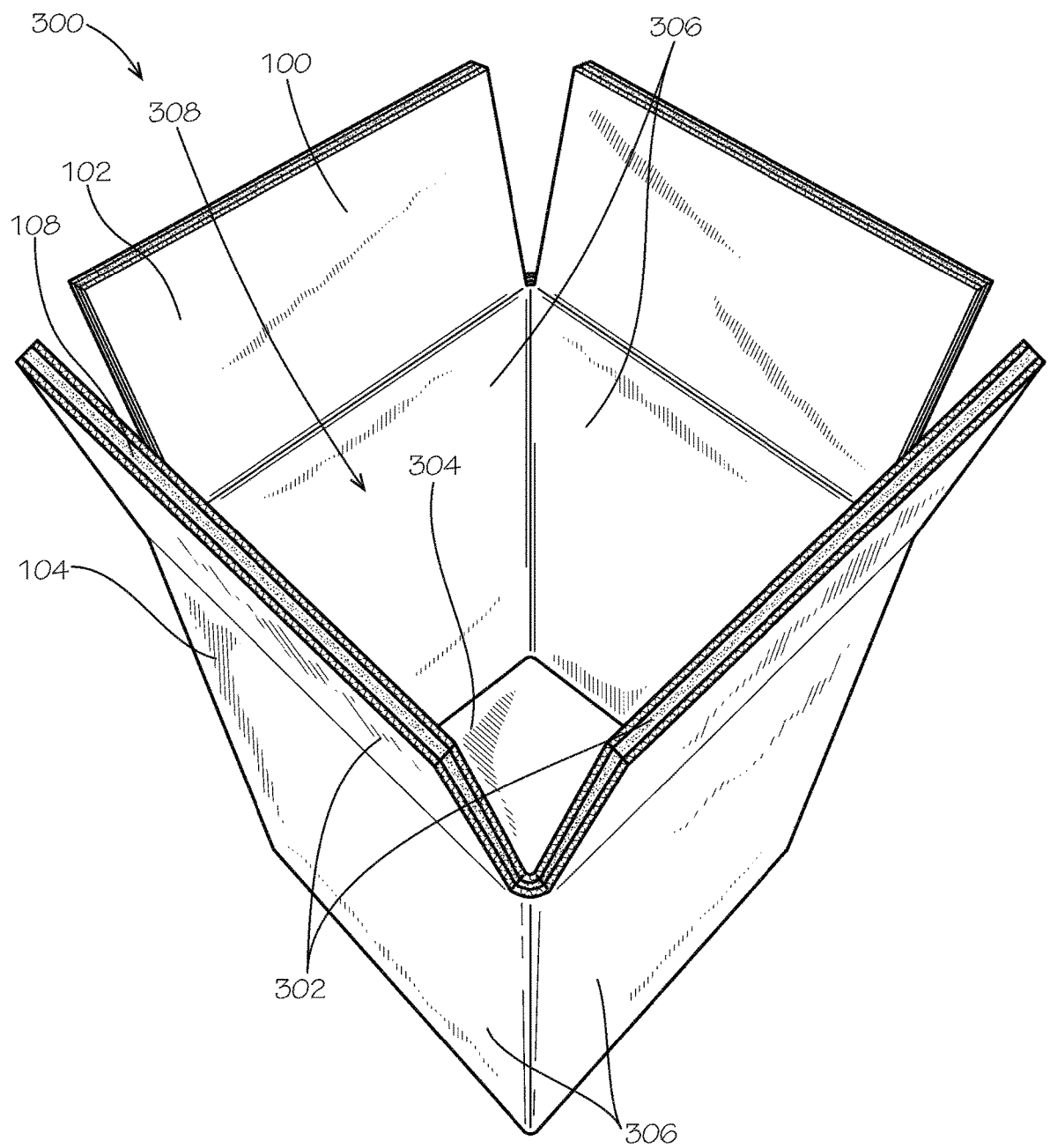
FIG. 8 is a perspective top view of another aspect of the box formed from the insulated panel of FIG. 5.

FIG. 8 is a perspective top view of another aspect of the box 300 formed from the insulated panel 100 of FIG. 5. The box 300 can be an example of an insulated container formed from the insulated panel 100. As shown, the top panels 302 can be in an open configuration, and the side walls 306 and bottom panels 304 can at least partially define a cavity 308 within the box 300. Specifically, the first layer 102 of the insulated panel 100 can face inwards and define the cavity 308; however, in other aspects, the second layer 104 (shown in FIG. 1) can define the cavity 308. The insulation material 108 can provide thermal insulation to the cavity 308, or for containers and products formed from the insulated panel 100, such as insulated cup sleeves for example and without limitation. The insulation material 108 can help maintain cold or hot temperatures within the cavity 308, particularly if a heat source material, such as a hot water bottle, or heat sink material, such as dry ice, is positioned within the cavity 308.

In this aspect, the first layer 102 can be substantially symmetrical to the second layer 104, and the top panels 302 can each comprise the insulation material 108.

Figure 9:
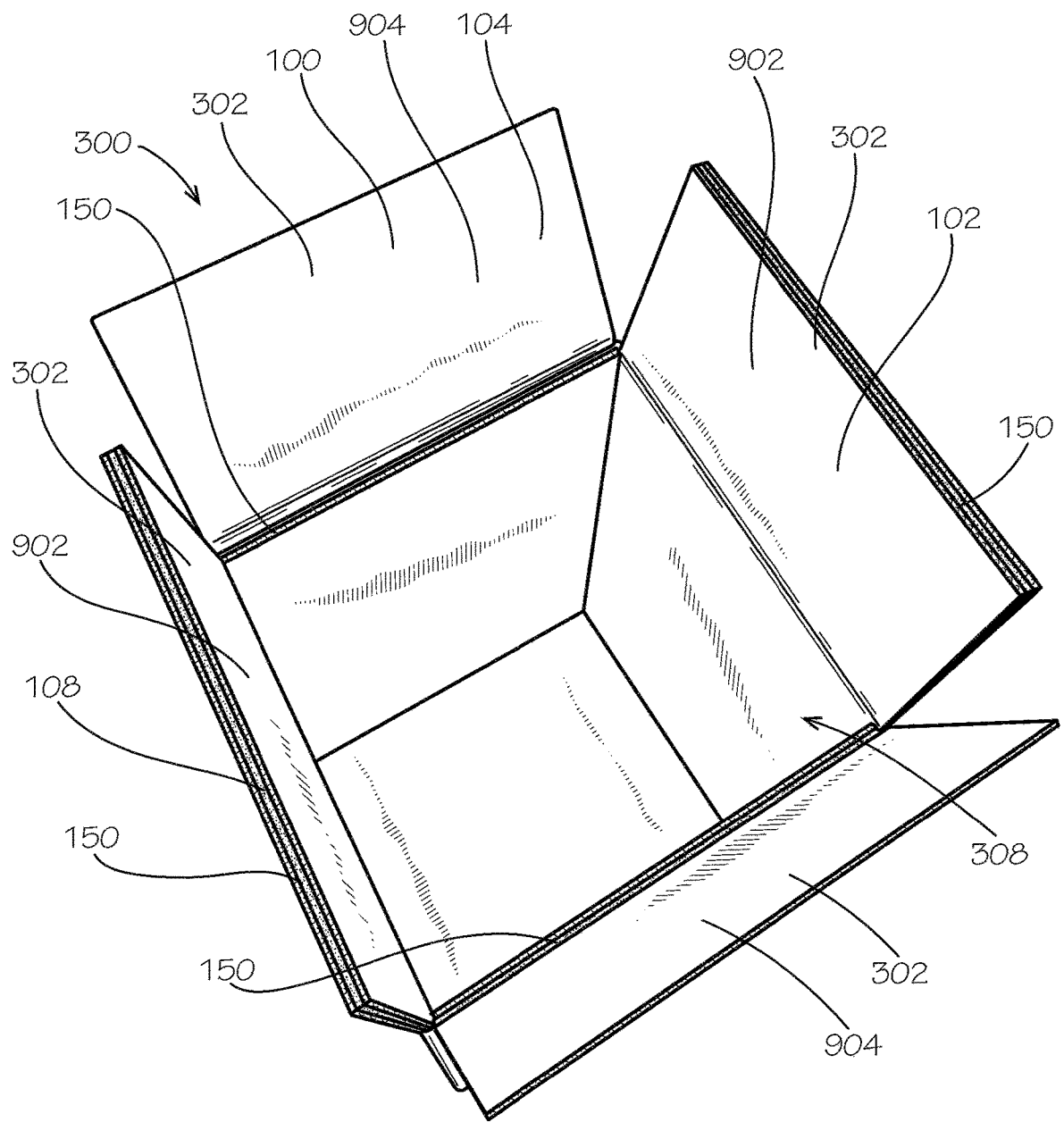
FIG. 9 is a perspective top view of another aspect of the box formed from the insulated panel of FIG. 5.

FIG. 9 is a perspective top view of another aspect of the box 300 formed from the insulated panel 100 of FIG. 5. In the aspect shown, the first layer 102 and the second layer 104 may not be symmetrical. Two of the top panels 302 can be insulated top panels 902, and two of the top panels 302 can be uninsulated top panels 904. The uninsulated top panels 904 can be defined by the second layer 104, and the uninsulated top panel 904 may not comprise the insulation material 108. In this aspect, if the insulated top panels 902 are first folded inward to enclose the cavity 308, and then the uninsulated top panels 904 are folded over them, the exposed edges 150 of the side walls 306 and insulated top panels 902 can be enclosed and covered by the uninsulated top panels 904. In other aspects, the uninsulated top panels 904 can be defined by the first layer 102.

A first method for manufacturing and utilizing the insulated panels 100 of FIG. 5 can comprise producing large master laminate blanks with as large a width and length as possible based on the limits of the manufacturing machinery. Forming the insulated panel 100 in the form of the master blank can comprise adhering the layers 102,104 to the insulation material 108. For example, the layers 102,104 can be adhered to the insulation material 108 with a starch-based adhesive. The insulation material 108 can be adhered to the layers 102,104 wherein the insulation material 108 is in a dry state. Smaller production blanks for specific products or products themselves, such as simple divider panels, could then be cut from the master blank in a layout that maximizes efficiency and reduces waste. If necessary, individual sheets of insulation material 108 can be seamed internally between the layers 102,104 to further increase the maximum allowable production size if size is limited by the size of available insulation material 108. In some aspects, cold set adhesive can be applied to the inner surfaces 103,105 to bond the insulation material 108 to the layers 102,104, respectively. In some aspects, 100% of the inner surfaces 103,105 can be bonded to the insulation material 108 with adhesive. While the adhesive dries or cures, the master blank can be stacked and placed under a pressure clamp to assure flatness and proper bonding between the insulation material 108 and layers 102,104.

A second method for manufacturing and utilizing the insulated panels 100 for FIG. 5 comprises producing individual insulation panels 100 at the box blank level for each production run, wherein each box blank can be turned into a single box, container, or other product. Slightly over-sized layers 102,104 can be laminated together and then trimmed around the edges 150 prior to production of the boxes to ensure that all sides of the blank are square and flush to the edge 150 with insulation material 108.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An insulated panel comprising:
   a first layer comprising corrugated cardboard, the first layer defining a plurality of flutes;
   a second layer comprising corrugated cardboard, the second layer defining a plurality of flutes;
   a first insulation material filling at least one flute of the plurality of flutes in the first layer;
   a second insulation material comprising a porous structure and filling at least one flute of the plurality of flutes in the second layer; and
   a third insulation material between the first layer and the second layer, the third insulation material comprising cellulose, the third insulation material being flexible, the third insulation material between the first layer and the second layer being different from the first insulation material or the second insulation material filling the at least one flute;
   wherein a first portion of the insulated panel is configured to fold relative to a second portion of the insulated panel when the insulated panel is in a dry state.

2. The insulated panel of claim 1, wherein:
   the first layer defines an inner surface; and
   the third insulation material is adhered to an entirety of the inner surface of the first layer.

3. The insulated panel of claim 1, wherein the second insulation material comprises starch.

4. A method for manufacturing an insulated panel, the method comprising:
   adhering a first insulation material to a first layer of the insulated panel, the first insulation material comprising cellulose, the first insulation material being flexible, the first layer comprising corrugated cardboard, and defining a plurality of flutes;
   filling at least one flute of the plurality of flutes of the first layer with a second insulation material comprising a porous structure;
   filling at least one flute of a plurality of flutes of a second layer comprising corrugated cardboard with a third insulation material;
   adhering the first insulation material to the second layer of the insulated panel, wherein the first insulation material adhered to the first layer and adhered to the second layer is different from the second insulation material filling the first layer;
   drying the insulated panel; and
   folding a first portion of the insulated panel relative to a second portion of the insulated panel after drying the insulated panel.

5. The method of claim 4, further comprising forming a box from the insulated panel, the insulated panel defining a box blank.

6. The method of claim 4, further comprising forming cutting multiple box blanks from the insulated panel, the insulated panel defining a master blank.

7. The method of claim 4, wherein the second insulation material comprises starch.

8. The method of claim 7, wherein the starch is a starch foam.

9. The method of claim 4, wherein the cellulose is cellulose fiber.

10. The insulated panel of claim 3, wherein the starch is a starch foam.

* * * * *